Nov. 13, 1962     A. H. GOTT     3,064,125
LUMINAIR
Filed Sept. 30, 1957     3 Sheets-Sheet 1
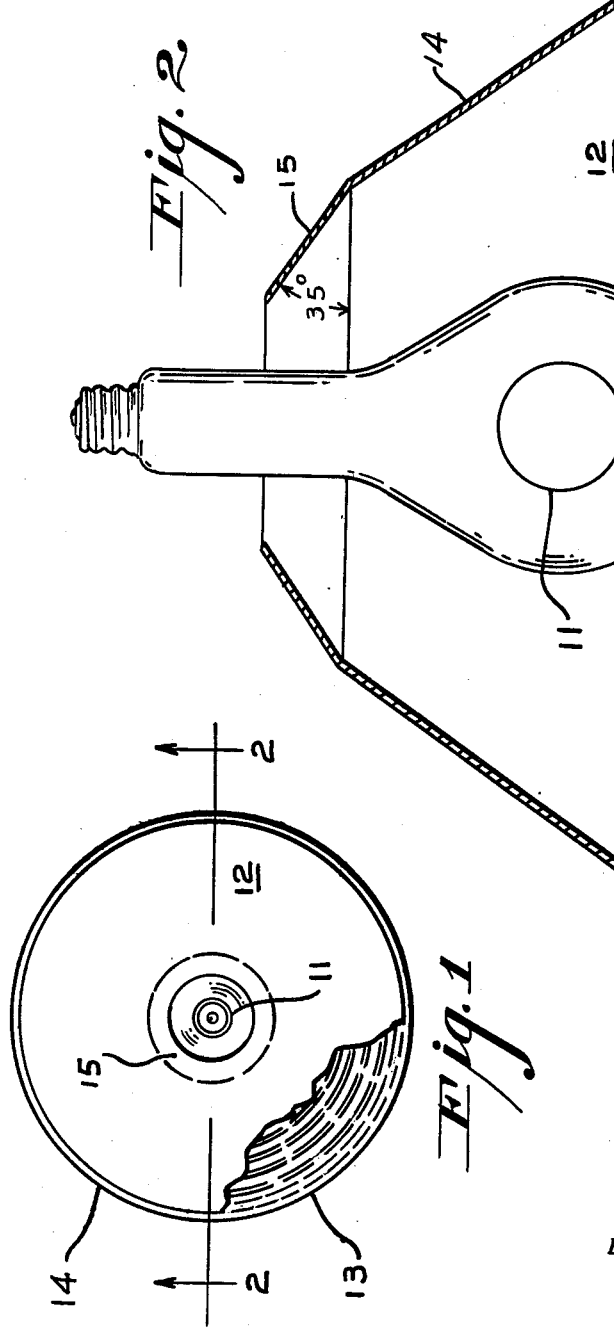
INVENTOR.
ALLAN H. GOTT
BY Clarence R. Patty, Jr.
ATTORNEY Nov. 13, 1962  A. H. GOTT  3,064,125
LUMINAIR
Filed Sept. 30, 1957  3 Sheets-Sheet 2

NADIR

INVENTOR.
ALLAN H. GOTT
BY Clarence R. Patty, Jr.
ATTORNEY.

INVENTOR.
ALLAN H. GOTT
BY Clarence R. Patty, Jr.
ATTORNEY ns is from light that is internally reflected from a "riser" surface onto an adjacent front prism surface. It has been found that such light approaches the adjacent front prism surface at an angle such that the light is refracted by the prism and emitted at a high angle, or above the selected "cut-off angle," instead of at an angle within the designed distribution zone. A secondary cause of high angle brightness results from refracted light emitted from the riser surfaces rather than from their respective adjacent prism surfaces.

United States Patent Office 3,064,125
Patented Nov. 13, 1962

3,064,125
LUMINAIR
Allan H. Gott, St. Paul, Minn., assignor to Corning Glass Works, Corning, N.Y., a corporation of New York
Filed Sept. 30, 1957, Ser. No. 686,999
1 Claim. (Cl. 240—41.3)

The present invention relates to luminairs, and more particularly to luminairs designed for interior illumination and employing a reflector and a lens in association with a light source, the lens acting on both reflected and direct light.

In conventional practice a luminair of the foregoing general character comprises a fresnel or prismatic lens, a light source, a reflector, and a suitable housing. The commonly accepted light source is an incandescent lamp; the reflector may assume any one of many different shapes. Ordinarily the fresnel lens is fundamentally a flat plate with symmetrically or asymmetrically arranged prismatic elements on one side and the other side (commonly the rear) plain. However, other less common forms of such lenses may embody various concave and convex surfaces, with either symmetrical or asymmetrical prismatic elements on one or both sides. Usually flat fresnel lenses are mounted flush with a ceiling and cover a suitable reflector and source recessed into the ceiling.

Lenses can of course be designed to produce in general any desired pattern of light distribution, either symmetrical or asymmetrical, which may cover a range of from an extra wide angle beam distribution to a very narrow or focusing beam distribution as the needs dictate. In any instance, however, it is highly desirable for the lens to cut off (emit substantially no light) above a certain angle from the vertical, such an angle including an area to be illuminated, while excluding an area that it is not desired to be illuminated, or more important, excluding a normally-positioned person's line of vision. Common practice is to orient the prism surfaces of a lens in such a manner that will enable it to control light from the source and from the reflector. However, it has been a common fault of past forms of lenses of the foregoing character that they emit light at high angles from the vertical in both a diffuse manner (from the entire lens) and also in a more objectionable manner in the form of concentrated streaks and spots of exceptionally high brightness particularly in the line of vision of a person in a remote area of the room containing the light source.

After a careful study of a variety of such lenses applicant has found that a principal origin of high angle brightness is from light that is internally reflected from a "riser" surface onto an adjacent front prism surface. It has been found that such light approaches the adjacent front prism surface at an angle such that the light is refracted by the prism and emitted at a high angle, or above the selected "cut-off angle," instead of at an angle within the designed distribution zone. A secondary cause of high angle brightness results from refracted light emitted from the riser surfaces rather than from their respective adjacent prism surfaces.

According to the invention the solution for the control of high angle brightness, resulting from the causes above outlined, is effected by altering the riser angle in such a way as to cause light intercepted by it to be totally internally reflected towards the associated prism surface and emitted therefrom at or below the cut-off angle or totally internally reflected towards the rear surface of the lens. Alternatively, the alteration of the riser angle may be such that light intercepted by the riser will be refracted and emitted at or below the predetermined cut-off angle. Under these circumstances substantially all of the rays must be emitted below the cut-off angle or not emitted, and therefore cannot produce "high angle" brightness.

As will be understood then, the reflector contour, the light source, the rear surface of the fresnel lens and the riser and prism surfaces, must be so arranged with respect to one another that any light ray intercepted by a prism surface or by an associated riser surface, irrespective of the light ray's source, is either internally reflected onto an associated riser or prism surface as the case may be, or is refracted and emitted below the predetermined desired cut-off angle. Obviously, none of such surfaces can emit all of the light which falls thereon and must reflect some of it either toward an adjacent oppositely sloped surface or in the general direction of the first incident surface. Although as hereinbefore mentioned both the reflector and lens may be given any one of many forms and that the lens may be designed for either asymmetrical or symmetrical light distribution; the invention will be described, by way of example, as applied to a specific conventional form of luminair embodying a source, a circular reflector of compound truncated conical form or double angle generally conical form, and a lens adapted for the symmetrical distribution of light.

In the accompanying drawings

FIG. 1 is a top plan view of a luminair embodying the invention with part of the reflector shown broken away.

FIG. 2 is a sectional elevation, on an enlarged scale, taken on line 2—2 of FIG. 1.

Figure 3:
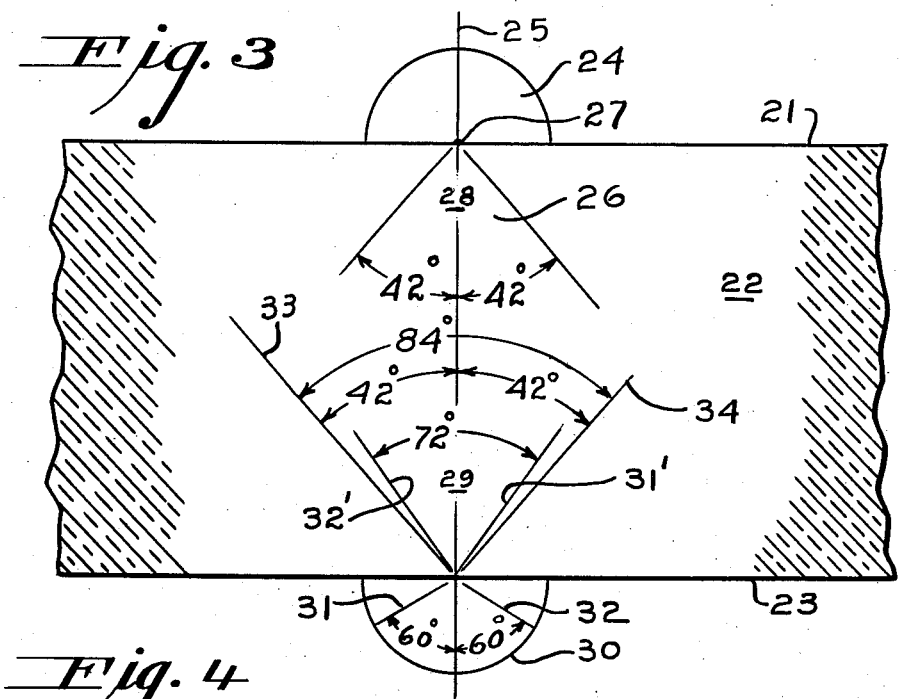

FIG. 3 diagrammatically illustrates the angle of acceptance of light of a piece of glass having an index of refraction of 1.5, and the glare zones in such glass for a selected cut-off angle.

Figure 4:
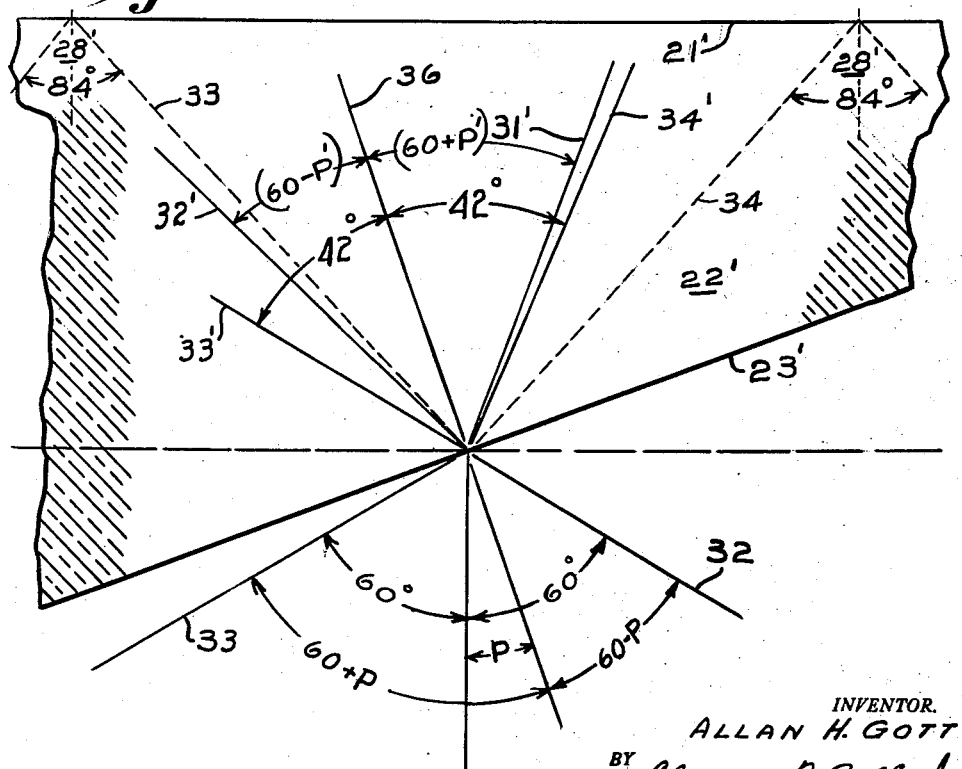

FIG. 4 illustrates the position of rays when the emitting surface of a piece of glass is inclined 20° with respect to its surface of acceptance.

Figure 5:
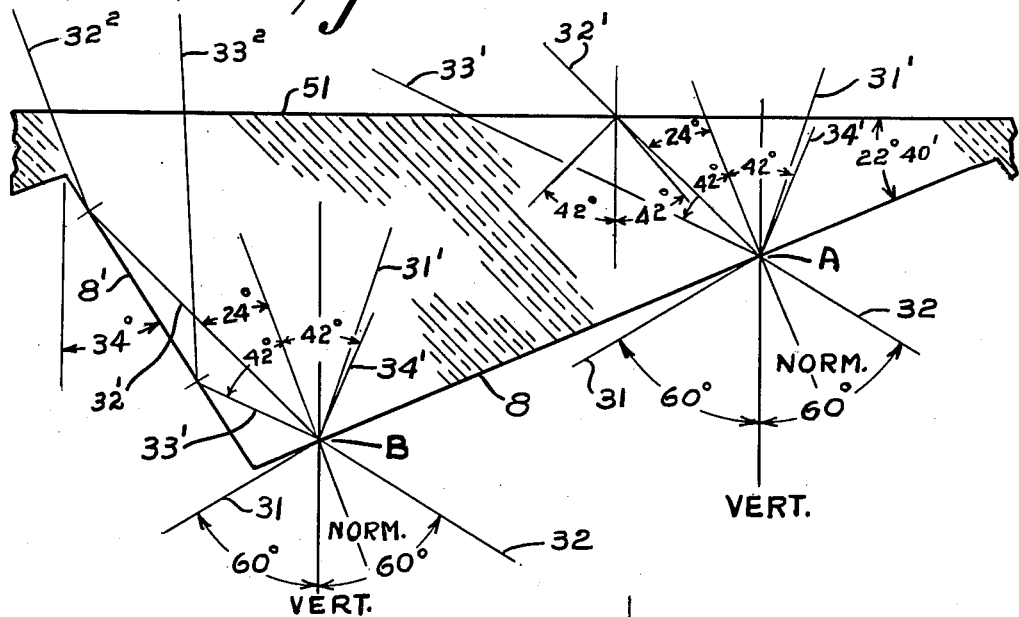

FIG. 5 is a greatly enlarged diagrammatic view of one prism of a lens embodying the invention, and of the riser associated therewith, and having indicated thereon several of the respective light paths between opposite surfaces thereof.

Figure 6:
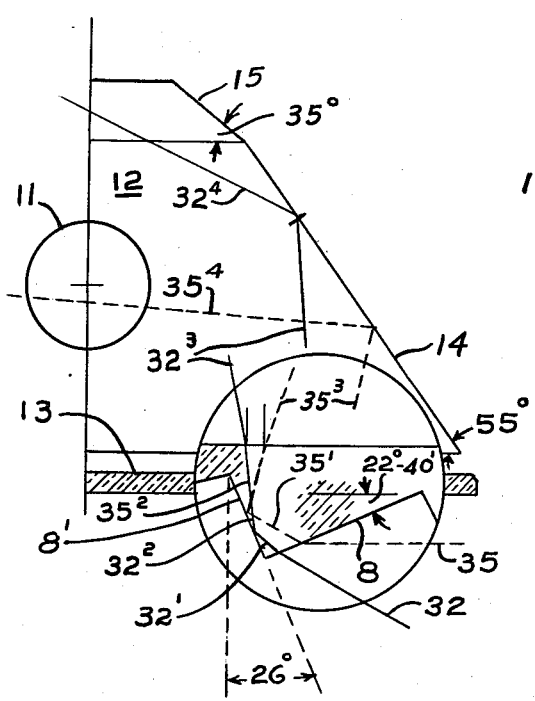

FIG. 6 is a view of a fragment of a luminair showing a highly magnified prism thereof before modification in accordance with the invention and illustrating ray paths thereof.

Figure 7:
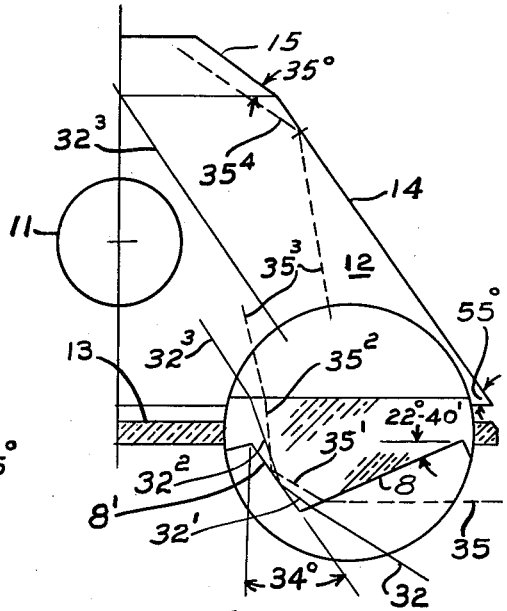

FIG. 7 is a view similar to FIG. 6, after modification in accordance with the invention and illustrating ray paths thereof.

In the luminair shown in FIGS. 1 and 2, a light source 10 having a major light output region 11, is centrally located within a two slope conical reflector 12, shown arranged over a fresnel lens 13 embodying the invention. As will be understood, however, the invention is equally applicable to luminairs having other forms of reflectors. With the light source emitted from the region indicated and employing a reflector such as 12 having a lower section such as 14 with a 55° slope from horizontal and having an upper section such as 15 with a 35° slope, the prism angles with respect to direct rays and the reflector reflected rays may be selected in known manner to in general attain the desired distribution of rays emitted with retention of a predetermined cut-off angle. Moreover, according to the invention it is possible to further adjust the riser angles of the prisms on the lens so that light intercepted by them and reflected onto the associated prism surfaces will be refracted thereby at or below the cut-off angle or alternatively be internally reflected so that substantially no light is emitted above the predetermined cut-off angle.

In the luminair shown it is assumed, for example only, that the glass employed has an index of refraction of 1.5, and that a 60° cut-off angle has been selected, as indicated. The angles through the respective fifteen zones represented by prisms 1 and 15 and those therebetween, in the past considered appropriate to obtain the desired distribution of direct and reflector reflected light with the light source location and reflector as shown, have been determined by conventional means and are given in the following table:

| Zone | Prism | Riser, Old | Riser, New |
| --- | --- | --- | --- |
| 1 | 6°45′ | 14° | 15°50′ |
| 2 | 10°10′ | 15° | 22°32′ |
| 3 | 13°30′ | 18° | 26°29′ |
| 4 | 16°15′ | 21° | 28°11′ |
| 5 | 18°10′ | 23° | 29°23′ |
| 6 | 19°55′ | 24° | 30°35′ |
| 7 | 21°30′ | 25° | 32°33′ |
| 8 | 22°40′ | 26° | 34° |
| 9 | 23°50′ | 27° | 35°28′ |
| 10 | 24°45′ | 28° | 35°56′ |
| 11 | 25°35′ | 29° | 36°39′ |
| 12 | 26°25′ | 30° | 37°22′ |
| 13 | 27°10′ | 31° | 37°51′ |
| 14 | 28°20′ | 32° | 38°50′ |
| 15 | 29°30′ | 32° | 39°19′ |

The above table also sets forth the riser angles as heretofore provided, and the riser angles as modified in accordance with the present invention as previously discussed.

Obviously, as already pointed out, any change in light source location and/or reflector contour will necessarily require a re-plotting of the beam angles to establish proper prism and riser angles to obtain a desired light distribution.

Referring now to FIG. 3, it will be observed that the incident surface 21 of the glass plate 22 and the emergent surface 23 are, for convenience, deemed to be in horizontal planes and the surface 21 above the surface 23. Any point on the upper surface 21 will receive light rays in the plane thereof from a semi-circular sector such as 24. Except for surface reflections, these rays will enter the refractor, typically glass, and will be within the critical angle 26 of 42° from the normal 25 to surface 21, for instance, if the index of refraction is 1.5. Such rays will, therefore, be within a sector 28 of divergent light of twice the critical angle of 42° with its apex at 27. Thus all the light entering the refractor at 27 will be within such sector and hence at any point on the lower or emergent surface 23 a ray will impinge on the surface 23 at angles of incidence not greater than the critical angle, namely, approximately 42°, or will cover a cone of 84°. This is illustrated by the lower sector 29. This light, except for internal reflections and losses suffered while exiting, will be transmitted throughout a semi-circular sector 30.

Keeping the above phenomenon in mind it is assumed by way of example that a lens is to be provided having a cut-off angle of 60°, represented by lines 31 and 32 respectively. By projecting these lines as lines 31′ and 32′ into the glass and having in mind the 1.5 refractive index of the glass, it will be apparent that such lines define a cone of refraction inside the glass of approximately 72°, as indicated. It immediately becomes apparent that if it is desired to minimize or eliminate light rays from the glare zones, those zones between lines 31 and 32 and the emergent surface 23, that it is only necessary to prevent light entering those regions of the 84° cone outside of the 72° cone, or in other words, in the zones 32′—33 and 31′—34.

As is apparent from FIG. 4, by providing a glass plate 22′ whose emitting surface 23′ is inclined to the horizontal, the zone between 31′ and 32′ is also inclined. In so doing, the angular dimension will change from 72° to some angle other than 72° dependent on the angle of inclination of surface 23′. Also, the distribution of zone 31′—32′ will shift with respect to the normal 36 to the emitting surface 23′. The zone between 31′ and 34′, already categorized as one zone which would emit light into the glare zone, has been minimized. It is obvious, then, that if the angle of inclination P of emitting surface 23′ is sufficient, zone 31′—34 will be eliminated, leaving only zone 32′—33′ to emit light into the glare zone. In FIG. 3 it was shown that light would only approach emitting surface 23 from sector 28. In FIG. 4 it is apparent that if the angle of inclination P of emitting surface 23′ is sufficient, it will not be possible for any light to leave surface 21′ and approach surface 23′ within the section of the parent glare zone between 32′ and 33′. From the preceding it can be seen how, when the emitting surface of a lens is divided into a pattern of differently tilted surfaces, it becomes possible to prevent the emission of rays above the selected cut-off angle by preventing light from approaching the emitting surface 23′ from within the internal or parent glare zone or by causing rays to fall on the surface from a region outside the critical angle with consequent internal reflection.

By way of example reference is now made to FIG. 5 which shows a greatly enlarged fragment of the lens 13 containing prism 8, its companion riser 8′, and the manner in which they function to restrict the emission of light intercepted by either, to the region below the selected cut-off angle. As will be observed, light rays intercepted by the emitting prism surface 8, at points such as A remote from the companion riser surface 8′ and outside the critical angle, such as any rays having angles of approach greater than the limiting rays indicated by lines 33′ and 34′, will be internally reflected and directed towards the incident surface 51 rather than being emitted. Considering this it can be seen that light rays striking point A outside of the angle formed by lines 33′ and 34′ will not be emitted from this region of prism surface 8. Moreover, rays striking point A between the angle indicated by lines 33′ and 32′ and between the angle indicated by lines 34′ and 31′ will be emitted from this region of prism surface 8 above the cut-off angle, while rays striking point A between the angle indicated by lines 31′ and 32′ will be emitted from this region of prism surface 8 below the cut-off angle. Thus it can be seen that it is only necessary to keep light from striking point A between the angles indicated by lines 33′ and 32′ and between lines 34′ and 31′ in order to keep light from being emitted from the regions of prism surface 8 above the cut-off angle.

On the other hand when a point similar to point A, such as point B, is located on the prism surface near its companion riser 8′, the manner in which certain of the rays under consideration approach point B is affected by the location and orientation of the companion riser 8′. Usually this phenomenon takes the form of internal reflection at the riser surface 8′ which alters the path of certain of the rays which would normally approach prism surface 8 directly from the back surface 51, without interruption, if point B were closer to point A.

Fundamentally, the same treatment may be applied to point B as to point A in order to keep light from being emitted into the glare zone above the cut-off angle. It is only necessary to deal with interruption of light rays which have struck riser surface 8′.

The same treatment may be applied to light rays that approach riser surface 8′ from rear surface 51 at an angle from the normal to riser 8′ of less than the critical angle. These rays will be refracted rather than being reflected to point B on prism 8. To eliminate light from the glare zone it is merely necessary to eliminate internal rays in certain zones, the same as discussed in the treatment of points A and B in the preceding paragraphs.

The foregoing may be clarified by reference to FIG. 6 wherein, with the riser angle unaltered, any rays emitted below a 90° angle 35 and above the cut-off angle represented by the line 32, traced back through the major region 11 of the light source represent objectionable light which will be emitted in the glare zone. Tracing line 32 back as 32′—32⁴ it is seen that any ray taking such path or traceable back through the region between the major light area 11 and line 32⁴ will not transmit any objectionable amount of light into the glare zone. However, any rays emitted below the horizontal and above the cut-off angle and traceable back through area 11 objectionably emits light into the glare zone. Tracing horizontal line 35 back, as lines 35′—35⁴, it becomes evident that a considerable bundle of rays will originate from area 11 between lines 35⁴ and 32⁴ and objectionably emit light into the region between lines 32 and 35. There are five ways of remedying this situation:

(1) Move the light center.
(2) Change the angle of the reflector.
(3) Incline the back surface of the lens at the section where the rays in question strike the surface.
(4) Change the riser angle.
(5) Change the prism angle.

All of these except number 4 are impractical, because such changes would necessarily require a change in other associated areas. Further, a change in 1, 3, or 5 would have a corresponding effect on direct light rays from the lamp, and would therefore upset the final candle power distribution from the luminaire. This leaves solution number 4 as the easiest and most practical, and is handled according to the following paragraph.

To determine how much to change the riser angle, it is first necessary to reorient the parent glare zone until it intercepts the smallest possible portion of the light source, preferably none. As illustrated in FIG. 7 the angular position of a ray represented by line 32³ is then plotted to miss the major region 11 of the light source on the side toward the ray represented by line 35³. Lines 32³ and 35³ must also both be on the same side of the light source. As can be seen, since line 32³ now misses the light source substantially no light will be emitted by a ray emitted along line 32. Now by tracing back line 35 to the newly determined angle of the riser it is found that the ray following line 35³ is reflected from surface 14 along line 35⁴ which is clearly outside the light source and therefore such rays will also be incapable of transmitting objectionable light into the glare zone.

As will be understood the technique employed in the above example is equally applicable in designing a new lens, providing that the location of the light source with respect thereto and the contour of the reflector are established. Moreover, although the invention has been illustrated and described as applied to a specific element form of fresnel lens contained in a luminair having a two slope conical reflector adapted for the symmetrical distribution of light, a similar square two-slope reflector or a single-slope pyrimidal reflector may be employed that will quite satisfactorily prevent objectionable high brightness in the usual lines of vision without the need for riser correction for such variations in shape of the reflector. Also, as will be apparent, there are an infinite number of other possible variations of this specific type of luminair in which the same fundamental principle may be applied to similar units adapted for asymmetrical distribution.

What is claimed is:

In a luminaire comprising a light source with an open mouthed reflector about the light source closed by a prismatic light-transmitting member disposed across the mouth of the reflector and having its prism surfaces arranged to intercept direct and reflected light and refractively transmit the same over an area below a predetermined angle below the horizontal, the improvement which resides in that the risers which interconnect said prism surfaces are so inclined with respect to the light source and the reflector wall that all light rays intercepted by a riser and reflected on to its associated prism surface at angles such that they will be emitted from said prism surface in the area between the horizontal and said predetermined angle below the horizontal will, upon being retraced into the luminaire, bypass the light source upon both their initial traces from the upper surface of said light transmitting member and their first reflections from said reflector wall.

References Cited in the file of this patent

UNITED STATES PATENTS

| | | |
|---|---|---|
| 1,641,674 | Halvorson | Sept. 6, 1927 |
| 2,101,199 | Rolph | Dec. 7, 1937 |
| 2,124,417 | Hamel et al. | July 19, 1938 |
| 2,272,119 | Jaeckel | Feb. 3, 1942 |
| 2,623,160 | McPhail | Dec. 23, 1952 |
| 2,648,763 | Rolph et al. | Aug. 11, 1953 |